United States Patent

[11] 3,586,194

| [72] | Inventor | Max J. Dechantsretter<br>Milwaukee, Wis. |
|---|---|---|
| [21] | Appl. No. | 851,239 |
| [22] | Filed | Aug. 19, 1969 |
| [45] | Patented | June 22, 1971 |
| [73] | Assignee | Harnischfeger Corporation<br>West Milwaukee, Wis. |

[54] ANTIFRICTION BEARING SUPPORT MEANS FOR A CRANE HAVING AN EXTENSIBLE SLIDE OR THE LIKE
1 Claim, 11 Drawing Figs.

[52] U.S. Cl. ................................................. 214/730
[51] Int. Cl. .................................................. B66f 9/14
[50] Field of Search ..................................... 214/730,
16.4, 16.42, 16.14, 16.16; 308/6 R

[56] References Cited
UNITED STATES PATENTS

| 1,429,557 | 9/1922 | Bauer | 308/6 R |
| 2,142,477 | 1/1939 | Murden | 308/193 |
| 2,370,861 | 3/1945 | Jakeway | 308/6 R |
| 3,245,512 | 4/1966 | Heyer | 308/6 R |
| 3,342,534 | 9/1967 | King | 308/6 R |
| 2,951,599 | 9/1960 | Bogar | 214/16.1 |
| 3,175,722 | 3/1965 | Paulssen | 214/16.4 (2) X |
| 3,232,455 | 2/1966 | Fountain et al. | 214/16.4 |
| 3,283,924 | 11/1966 | Chasar | 214/16.4 (2) |

FOREIGN PATENTS

| 1,010,991 | 4/1952 | France | 308/6 R |
| 1,416,298 | 9/1965 | France | 214/16.4 (2) |
| 951,958 | 3/1964 | Great Britain | 214/16.1 (4-B) |

*Primary Examiner*—Gerald M. Forlenza
*Assistant Examiner*—Raymond B. Johnson
*Attorney*—James E. Nilles ABSTRACT: An improved antifriction bearing support for a load supporting slide of a crane, which slide is extendible on relatively moving members so as to be able to extend the load from the crane into a storage aisle or the like. The improved antifriction bearing support means includes ball races which are so formed that the hardened ball elements contact the opposed races at four points of contact, to thereby provide weight supporting thrust as well as lateral support thrust. An improved drive means is also provided for laterally shifting the relatively moving slide members.

PATENTED JUN22 1971
3,586,194
SHEET 1 OF 4
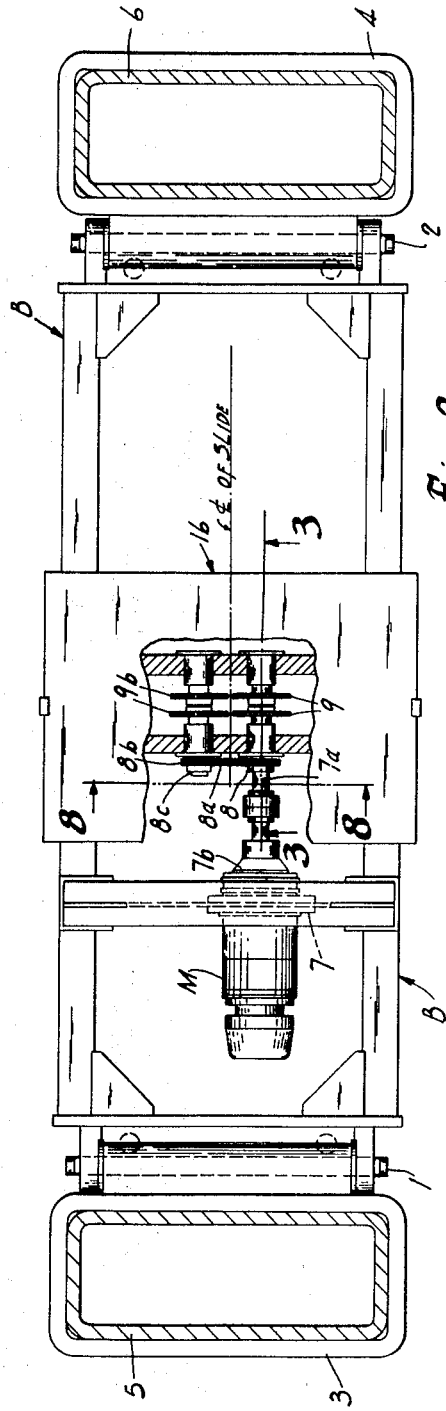
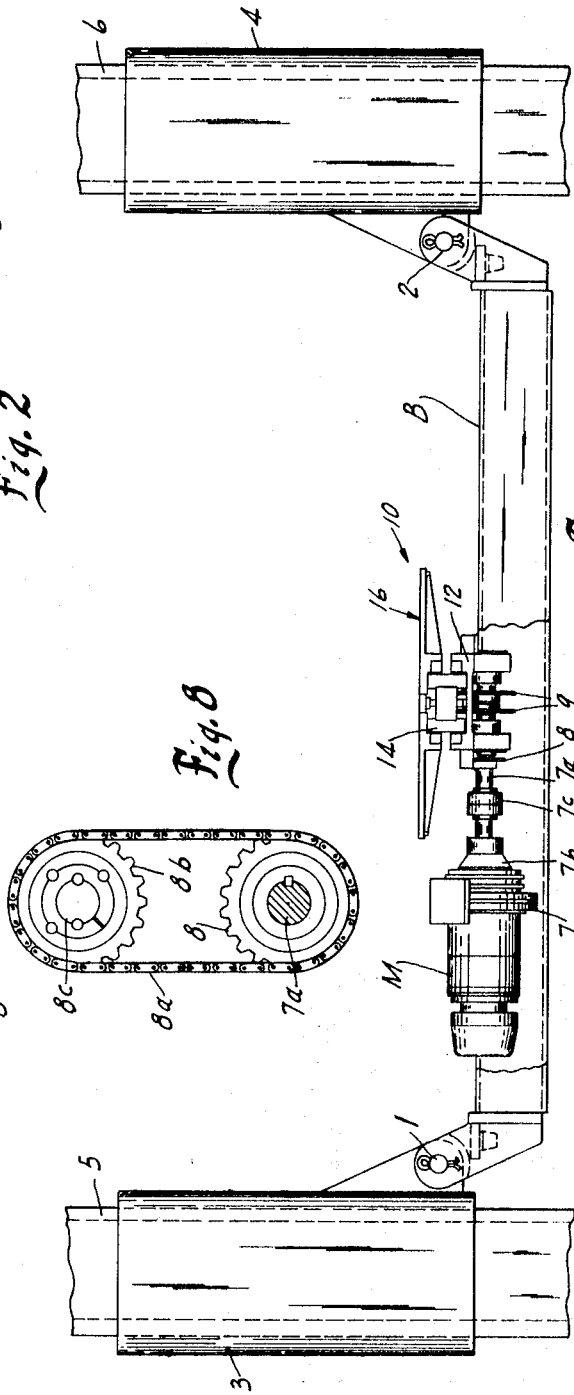
INVENTOR:
MAX J. DECHANTSREITER
BY:
*James E Nilles*
ATTORNEY

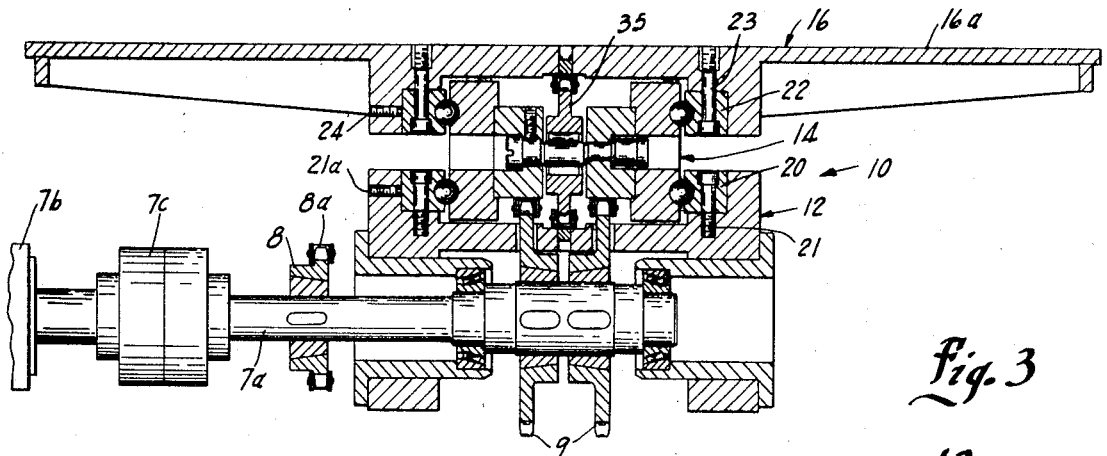
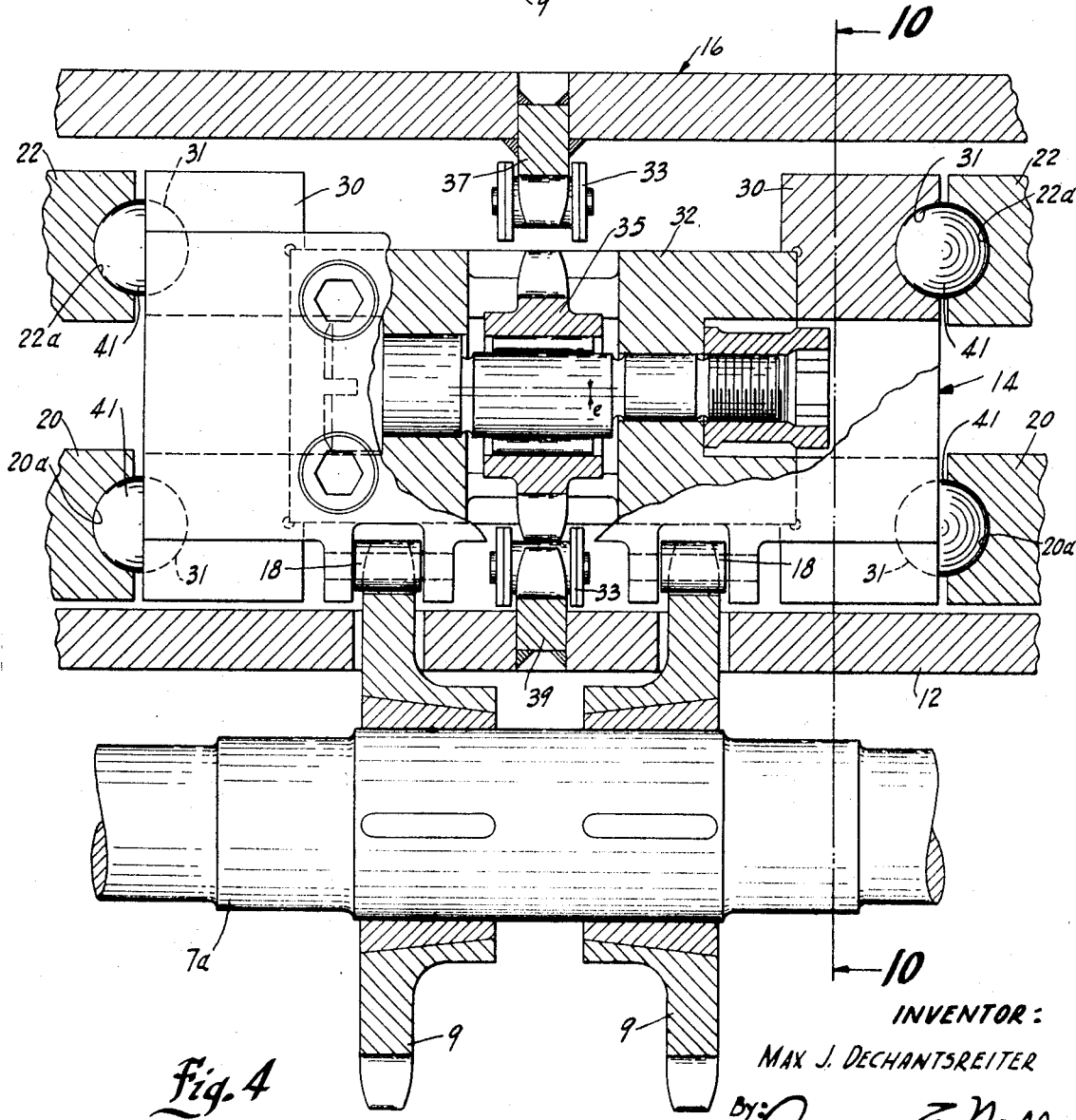

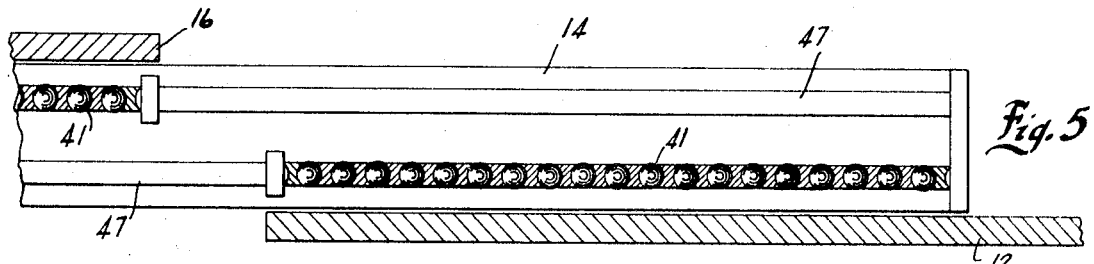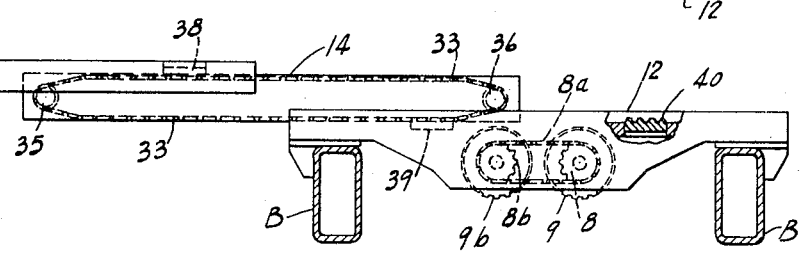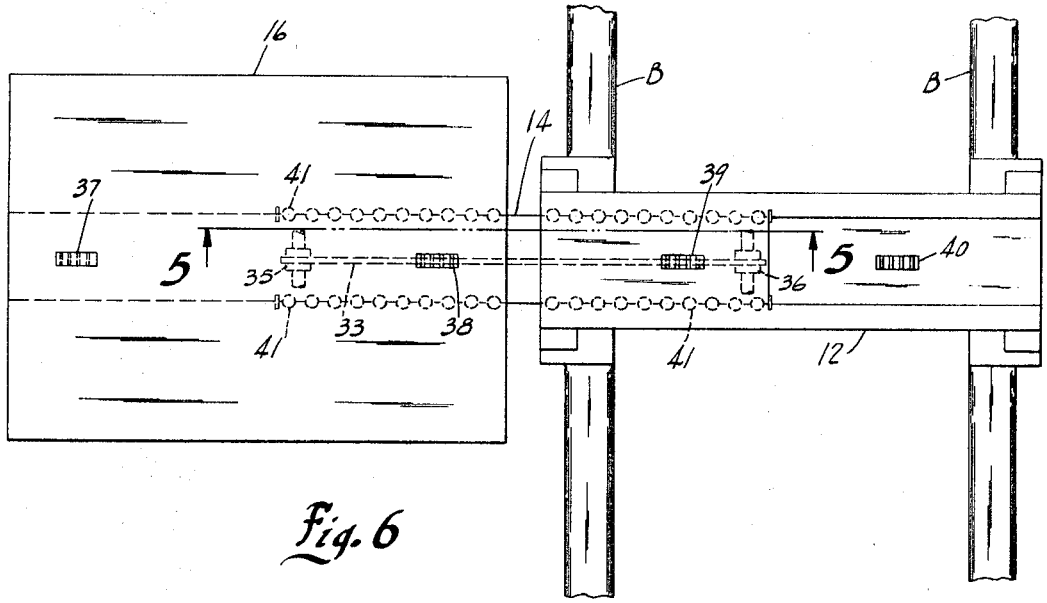

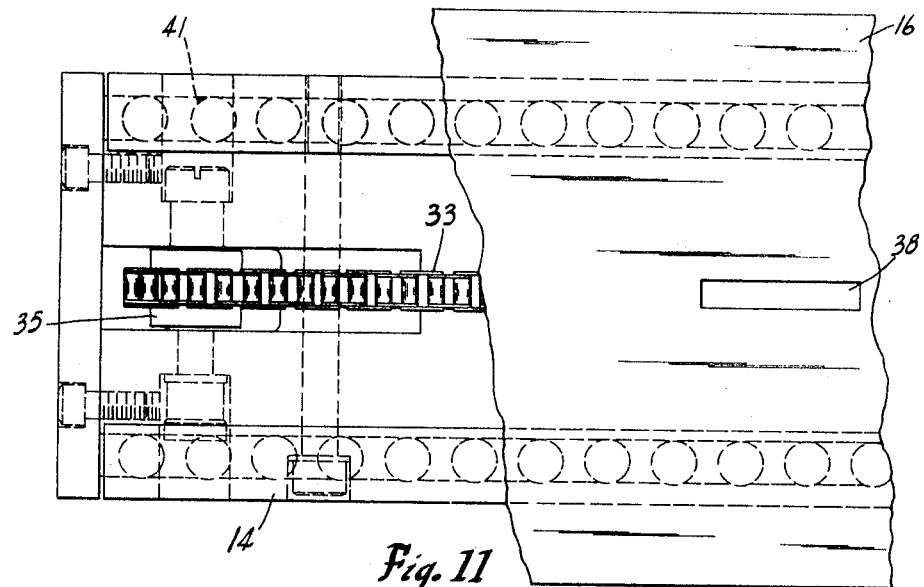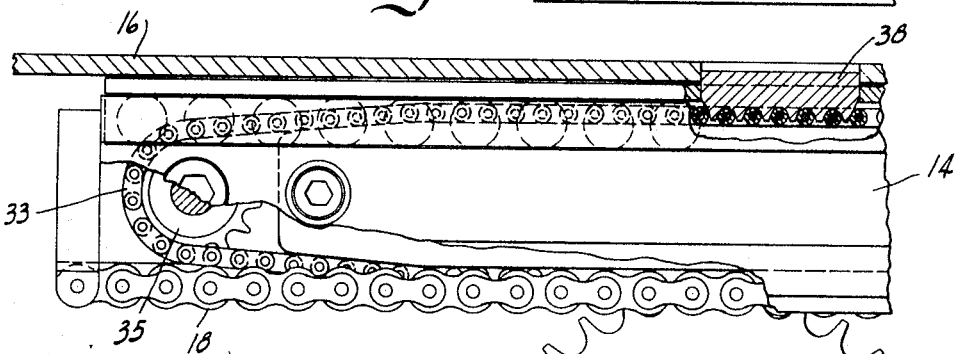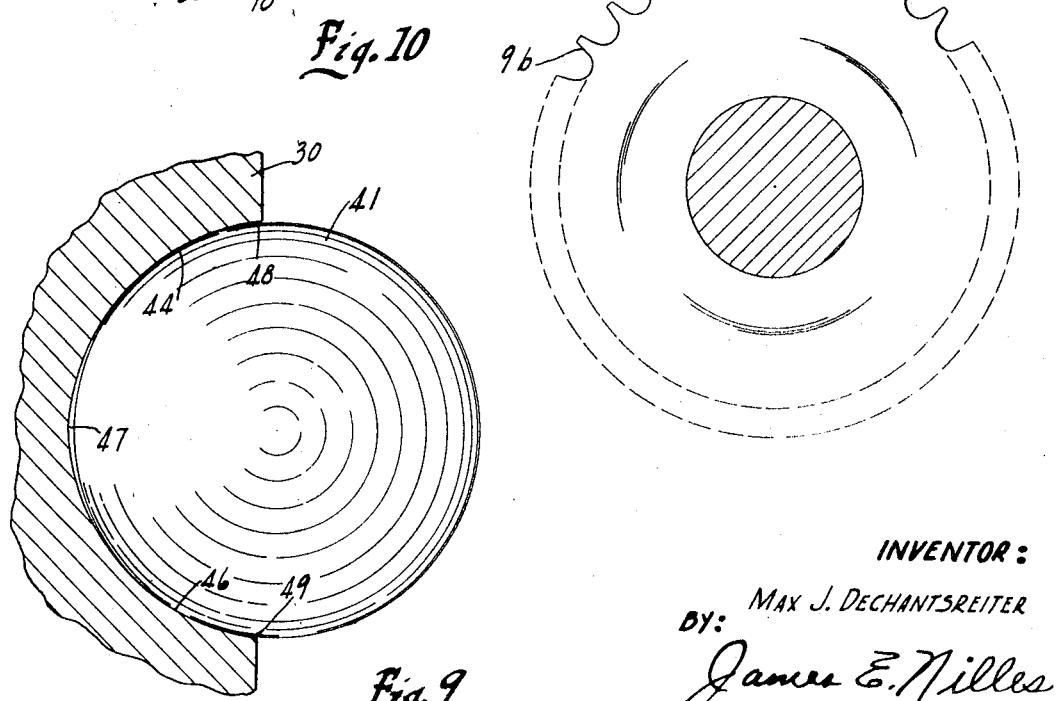

ANTIFRICTION BEARING SUPPORT MEANS FOR A CRANE HAVING AN EXTENSIBLE SLIDE OR THE LIKE

BACKGROUND OF THE INVENTION

Prior art cranes of the type with which the invention finds particular utility, such as stacker cranes, have utilized extensible load supporting slides which are arranged to be extensible from the crane, usually in either direction so as to be able to be insertable in a storage aisle where the load can then be readily moved from the slide into the storage area. Various forms of extensible means and bearing supports therefor have been proposed in the past, but these have had several shortcomings, among which is rather complicated arrangements for insuring support not only for the weight on the load, but against lateral movement. In order to insure stabilizing in all directions, these prior art devices have usually utilized a combination of different types of bearings so as to provide the necessary guiding support. These devices have not only been complicated in structure, difficult to maintain and repair, but also are costly to manufacture.

An example of such a prior art arrangement is shown in the U.S. Pat. No. 3,283,924, issued Nov. 8, 1966 and entitled "Extractor Apparatus with Curved Guides."

SUMMARY OF THE INVENTION

The present invention provides an antifriction bearing support means for an extensible slide for a stacker crane or the like in which a straight and flat, opposed races are provided for the hardened steel balls located between the races. More specifically, the grooves in the straight races are formed so as to present only two points of contact with the balls for each race, making a total of four points of contact with the balls for the combined bearing assembly. The arrangement is such that the antifriction ball elements and their particular races provide support in the vertical direction as well as support in any lateral direction. The resulting structure is simple in construction, foolproof in operation, easy to maintain and economical to manufacture.

Another aspect of the invention relates to an improved means for driving the slide positively in its extending or contracting directions.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a stacker crane embodying the present invention;

FIG. 2 is a plan view of the crane shown in FIG. 1, certain parts being shown as broken away, removed, or in section for the sake of clarity in the drawings;

FIG. 3 is an enlarged sectional view of a portion of the device shown in FIGS. 1 and 2, with the view being taken generally along the line 3–3 in FIG. 2;

FIG. 4 is a further enlarged, fragmentary view of a portion of the device shown in FIG. 3 which holds the adjacent inner races together;

FIG. 5 is an enlarged sectional view taken along the line 5–5 in FIG. 6;

FIG. 6 is a schematic plan view of the device shown in FIG. 1, the view being on a smaller scale and generally schematic in nature;

FIG. 7 is a view similar to FIG. 6, but is a side elevational view thereof and taken along line 7–7 in FIG. 6;

FIG. 8 is a sectional view taken along line 8–8 in FIG. 2;

FIG. 9 is a still further enlarged view showing the detailed shape of one of the grooves in one of the bearing races as shown in FIG. 4; FIG. 10 is a fragmentary, side view taken along line 10 in FIG. 4, but on a smaller scale; and FIG. 11 is a plan view of the FIG. 10 showing, certain parts being shown as broken away for clarity.

DESCRIPTION OF THE PREFERRED EMBODIMENT

The invention has been shown for the purpose of illustration as being applied to a stacker crane wherein the invention finds particular utility. These cranes are generally arranged to travel down a path between rows of storage bins or the like, and are provided with a laterally extensible slide which can be extended into the individual bins which are arranged at 90° to the said path. The material can then be readily unloaded from the extended slide and into the individual bins or other storage containers. As these slides must support a considerable amount of weight, it is essential that they can do so when in extended, overhanging position; furthermore, the extended slide must be rigidly held in a lateral direction to prevent swaying or misalignment of the relatively extensible members. The crane shown by way of example only for illustrating the invention includes a large, generally rectangular in plan, carriage beam B which is supported at either end by carriage pins 1 and 2, respectively, which in turn are attached to vertically positionable carriage sleeves 3 and 4, slideable on crane masts 5 and 6 respectively. A reversible electric motor M is flange mounted to a speed reducer 7b which in turn is mounted by a bracket 7 on the beam. The speed reducer output shaft is coupled to shaft 7a to which is fixed sprocket 8, and a double sprocket 9. Sprocket 8 drives through a roller chain 8a to another sprocket 8b mounted on shaft 8c in the frame. A double sprocket 9b is fixed to the end of shaft 8c for being driven thereby.

An intermediate slide 14 is driven laterally by sprockets 9 and 9b. More specifically, as shown in FIG. 7, the double sprockets 9 and 9b drivingly engage the lengths of roller chain 18 (FIGS. 4 and 10) which are fixed to the under side of intermediate slide 14.

It will be noted in looking at FIG. 2 that the double sprocket 9 is located on one side of the longitudinal centerline of the beam B and double sprocket 9b is located on the other side of the centerline. As will appear, sprockets 9 and 9b drive a slide mechanism 10 to one side of the beam or the other.

When the slide 14 is driven to the outer limit of one side as shown in FIG. 7, the sprocket 9b at that side remains in driving contact with the chain 18, as will appear. When the slide is driven all the way to the other side, sprocket 9 remains in engagement.

The slide mechanism in general includes a slide base 12 fixed on the beam B, the laterally shiftable intermediate slide 14, and a laterally shiftable top slide 16. It is the top slide 16, which has a large top bearing surface 16a on which the load or material (not shown) is adapted to be supported. The base slide 12 is relatively fixed in relationship to the beam B, and as shown in FIGS. 6 and 7, the intermediate slide 14 and top slide 16 are movable relative to each other and to the slide base 12 to thereby be extendible in either direction from the base slide 12 and the carriage beam in general.

BEARING SUPPORT MEANS

The antifriction bearing support means provided by the present invention are located between the slide base 12 and the intermediate slide 14 and they are also located between the intermediate slide 14 and the top slide 16 as follows.

The slide base includes a pair of opposed and spaced apart, hardened, straight and flat ball races 20 (FIGS. 3 and 4) which are rigidly secured to the slide base by the cap screws 21. A set screw 21a is provided along one of these races 20 so as to be able to precisely align the bearing assembly as will appear. Thus, a pair of opposed races 20 are rigidly secured in the slide base.

The top slide has a pair of similar ball races 22, in opposed relationship with one another, and vertically aligned above their respective and adjacent races 20 on the slide base. Races 22 are similarly fixed to the top slide 16 by cap screws 23 and a set screw 24.

The intermediate slide 16 has one pair of races 30, each of which have a double groove 31 formed in their outwardly facing surfaces. The intermediate slide 14 also includes a central member 32 to which the races 30 are rigidly attached, as by welding, for example. A pair of roller sprockets 35, 36 (FIG. 7) are mounted on a member 32, one at each end thereof. An endless roller chain 33 is trained around these sprockets 35, 36 and engages a set of upper teeth 37 or upper teeth 38 (FIGS. 4 and 7), depending on which direction the slide mechanism is driven. These sets of teeth are fixed to the underside of top slide 16 and may be of various forms, such as a short rack of teeth as shown.

Another pair of teeth 39 and 40 (FIG. 7) are fixed adjacent the top of the base 12 also for engagement with the roller chain 33. More specifically, when the top slide is shifted to that side of the beam B as shown in FIGS. 6 and 7, then teeth 39 are engaged by the chain 33. When the slide is driven to the other side of the beam by the sprockets, then teeth 40 are engaged by the chains. Thus the chain 33 and the sets of teeth 37, 38, 39 and 40 act to translate movement from the base 12 to the top slide, through the intermediate slide 14.

The faces 20 have ball seating grooves 20a along the side adjacent to the intermediate slide, and the top slide races 22 have similar grooves 22a which are located adjacent and face the grooves 31 of the intermediate slide. Hardened steel balls 41 are located in the opposed grooves 42 of the slide base, the intermediate slide and the top slide and thus, four antifriction bearing ball and groove arrangements are provided between the base slide and the top slide through the intermediate slide.

The grooves 20a, 22a and 31 are all similar in cross-sectional shape, and reference to this particular shape will be made in connection with FIG. 9.

The shape of the grooves are such that a line contact between the ball 41 and groove 31 for example, is formed at point 44 and also at point 46. In other words, there is a clearance between the ball and the groove at 47 and also at 48 and 49.

Resume

The present invention provides particularly shaped race grooves in which the ball bearing assemblies can provide both vertical and lateral support without binding or friction, and therefore the need for specifically shaped, tapered, or needle bearings has been eliminated and consequently, the bearing assemblies can be standardized.

The present invention also provides a novel means for laterally shifting the relatively movable slide members whereby positive control thereof and good load supporting capability are assured at all times.

I claim:

1. A crane having a vertically movable beam means, a base mounted on said beam means, an intermediate slide mounted on and shiftable supporting slide mounted on and shiftable horizontally relative to said intermediate slide and base, antifriction bearing support means between said base, intermediate slide and said top slide for slidingly supporting said slides, said support means including, ball races on said intermediate slide and base, ball races on said top slide which races are aligned with said races on said intermediate slide, the ball races on said base being aligned with at least one of the races on the intermediate slide, said races having substantially straight grooves formed therein and so arranged whereby grooves in said intermediate slide opposingly face and are horizontally aligned with adjacent grooves on said top slide and base, balls located in the oppositngly facing grooves of said slides and base for rolling therein as said slides shift relative to the base and each other, said grooves being of a semicircular cross-sectional shape so that said balls contact each groove at only two points along the length of said grooves whereby said support means can resist thrust in vertical and lateral directions as said slides are extended relative to said base, the central portion of each of said races and balls being disposed in spaced parallel vertical planes that are substantially perpendicular to the base and top slide, at least one of said planes being laterally outwardly of a side surface of said intermediate slide and laterally inwardly of a side surface of the base, a series of teeth rigidly fastened to said top slide, a second series of teeth rigidly fastened to said base, movable means rotatably mounted on said intermediate slide and engageable with said teeth, a series of projections mounted on said intermediate slide adjacent a lower portion thereof, and a drive sprocket mounted on said base and engageable with said projections for driving the latter and consequently shifting said intermediate slide, whereby movement of said intermediate slide causes movement of said top slide through said sprocket means and series of teeth.